(12) United States Patent
Zaidi

(10) Patent No.: US 10,152,523 B2
(45) Date of Patent: Dec. 11, 2018

(54) COPYING DATA VIEW PORTIONS RELEVANT FOR ANALYSIS AND/OR COLLABORATION

(71) Applicant: Business Objects Software Limited, Dublin (IE)

(72) Inventor: Huma Zaidi, Delta (CA)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 447 days.

(21) Appl. No.: 14/930,259

(22) Filed: Nov. 2, 2015

(65) Prior Publication Data

US 2017/0124150 A1    May 4, 2017

(51) Int. Cl.
   *G06F 17/30*    (2006.01)
   *G06Q 10/10*    (2012.01)

(52) U.S. Cl.
   CPC .. *G06F 17/30554* (2013.01); *G06F 17/30383* (2013.01); *G06F 17/30448* (2013.01); *G06Q 10/10* (2013.01)

(58) Field of Classification Search
   CPC ......... G06F 17/30448; G06F 17/30383; G06F 3/04842
   See application file for complete search history.

(56) References Cited

U.S. PATENT DOCUMENTS

| | | | | |
|---|---|---|---|---|
| 5,040,131 A | * | 8/1991 | Torres | G06F 3/0481 715/210 |
| 5,987,450 A | * | 11/1999 | Levy | G06F 17/30371 |
| 6,226,647 B1 | * | 5/2001 | Venkatasubramanian | G06F 17/30454 |
| 2003/0229625 A1 | * | 12/2003 | Melchior | G06F 17/30477 |
| 2004/0172616 A1 | * | 9/2004 | Rothschiller | G06F 17/2247 717/114 |
| 2009/0144313 A1 | * | 6/2009 | Hodge | G06F 17/30592 |
| 2009/0187825 A1 | * | 7/2009 | Sandquist | G06F 17/241 715/719 |
| 2010/0235771 A1 | * | 9/2010 | Gregg, III | G06T 11/206 715/769 |
| 2011/0055682 A1 | * | 3/2011 | Friedrich | G06F 17/245 715/227 |
| 2016/0246769 A1 | * | 8/2016 | Screen | G06F 17/243 |

* cited by examiner

*Primary Examiner* — Jorge A Casanova
(74) *Attorney, Agent, or Firm* — Fountainhead Law Group P.C.

(57) ABSTRACT

Embodiments relate to transforming data views for analysis and/or collaboration purposes. An original data view is displayed on a document page in response to a database query. A filter operation is performed by selecting a specific subset of that original data view. A copy of that transformed data view portion including a tuple, is displayed in a separate analysis space (e.g., on the same document page, on another page, or within a collaboration panel). In one example, a user clicks/drags a subset of a table data view for transformation and copying. When the selected and transformed data view portion is copied to the analysis space, relevant associated context information (e.g., the underlying query, measures, dimensions, chart legends, formatting) may be retained for later access. To conserve the limited space typically available to a collaboration panel, certain embodiments may simplify presentation by reproducing only the characters of the transformed data portion.

15 Claims, 14 Drawing Sheets

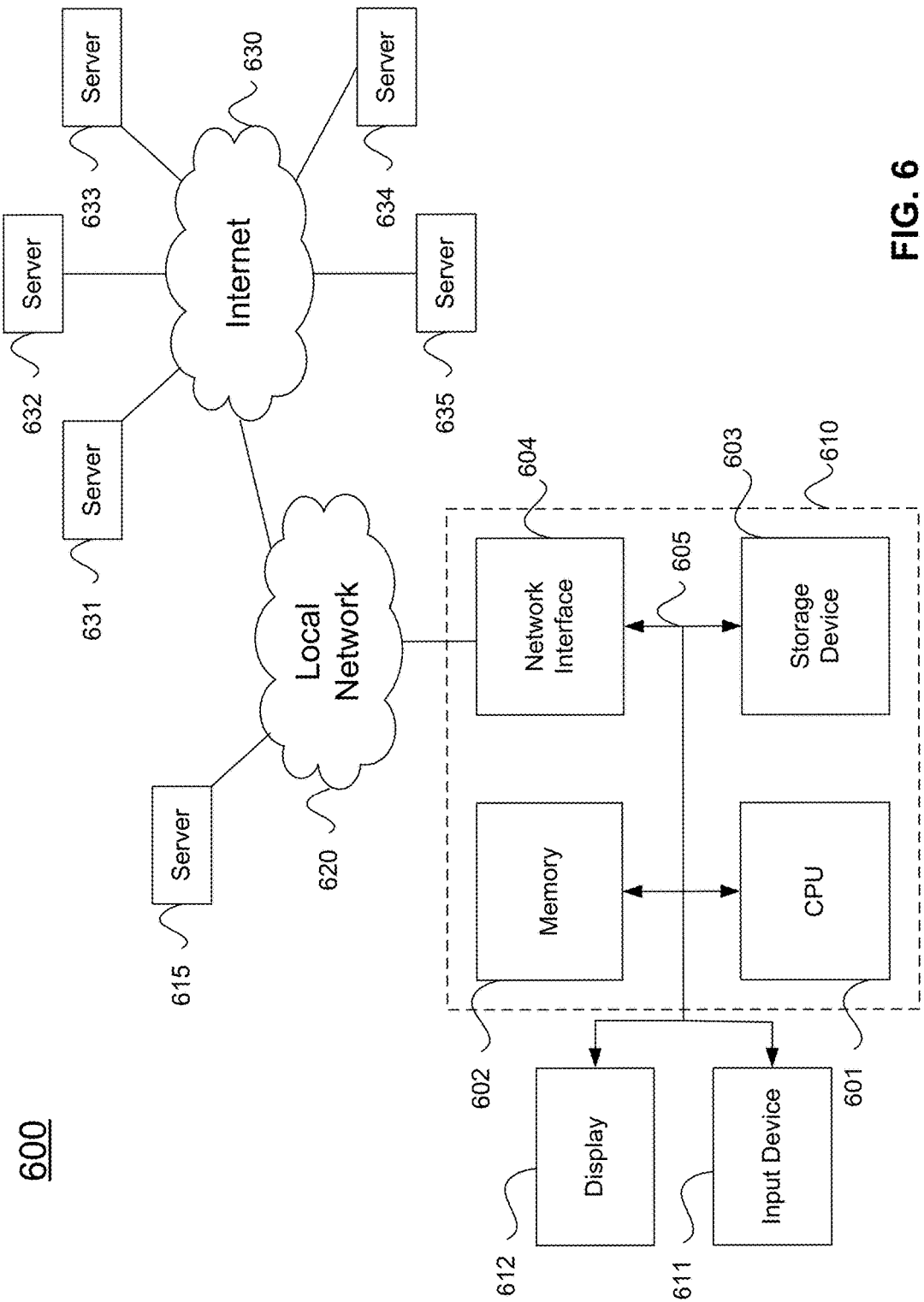

COPYING DATA VIEW PORTIONS RELEVANT FOR ANALYSIS AND/OR COLLABORATION

BACKGROUND

Unless otherwise indicated herein, the approaches described in this section are not prior art to the claims in this application and are not admitted to be prior art by inclusion in this section.

Embodiments relate to data visualization techniques, and in particular, to methods and apparatuses providing copying of data view portions relevant for analysis and/or collaboration.

Relational databases offer a useful mechanism for storing and analyzing volumes of related data. One common form of database storage is as a table comprising rows and columns.

The increasing power of databases has resulted in the formation of database tables of ever-greater size and complexity. Data volumes comprising millions or an even a larger number of records, may commonly be accessible utilizing database technologies.

Typically only a relatively small subset of database data may actually be relevant to any particular analysis and/or collaboration task. Conventionally, however, formatting larger data sets to highlight subsets thereof, requires a user to perform a number of manual steps. For example the user may need to manipulate and/or delete non-relevant columns, rows, and cells etc., a potentially time-consuming task.

And, even where the user does manage to manually select a relevant data portion and separate it from the larger visualization, the context of the selection may not be readily apparent. Similarly, when the user seeks to collaborate with others regarding a table or other data visualization, the subject of discussion is generally not the entire data set, but rather a limited subset of particular importance.

Accurate, insightful analysis of database data may thus depend upon a user being able to highlight a few important items. Where, however, large volumes of data are being stored in the database, that critical data can become obscured or masked within the mass of data, and its significance lost on an analyst and/or collaborator.

SUMMARY

Embodiments relate to visualizing transformed data, and in particular to transforming existing data views for analysis and/or collaboration purposes. An original data view is displayed on a document page in response to a database query. An interface allows performing a filter operation by selecting a specific subset of that original data view. A copy of that transformed data view portion including a tuple (e.g., measure name, measure value), is displayed in a separate analysis space (e.g., on the same document page, on another page, or within a collaboration panel). In one particular example, a user may click and drag a subset of a table data view for transformation and copying. When the selected and transformed data view portion is copied to the analysis space, relevant associated context information (e.g., the underlying query, measures, dimensions, chart legends, formatting) may be retained for later access based upon further user input. In order to conserve space in the limited area typically available to a collaboration panel, certain embodiments may simplify presentation by reproducing only the characters (i.e., text, numbers, symbols) of the copied data portion.

An embodiment of a computer-implemented method comprises an engine receiving a data view in response to a query to a database, the engine displaying the data view in a document page. The engine receives a user input selecting a subset of the data view. In response to the user input, the engine transforms the data view to create a data view portion including a tuple and associated context information, and displays a copy of the tuple in an analysis space.

A non-transitory computer readable storage medium embodies a computer program for performing a method comprising an engine receiving a data view in response to a query to a database, and the engine displaying the data view in a document page. The engine receives a user input selecting a subset of the data view. In response to the user input, the engine transforms the data view to create a data view portion including a tuple and associated context information, and displays a copy of the tuple in an analysis space. The engine provides the associated context information in response to additional user input to the analysis space.

An embodiment of a computer system comprises one or more processors and a software program, executable on said computer system. The software program is configured to cause an in-memory database engine to provide a data view on a document page in response to a query to an in-memory database, and receive a user input selecting a subset of the data view. In response to the user input, the software program is configured to cause the engine to transform the data view to create a data view portion including a tuple and associated context information, and to display a copy of the tuple in an analysis space.

In some embodiments the data view comprises a table, the subset comprises cells of the table, the copy of the tuple comprises a measure value.

In certain embodiments the analysis space is in a collaboration panel.

According to particular embodiments the tuple includes characters only.

In various embodiments the copy of the tuple comprises a measure name and the measure value.

According to some embodiments the user input comprises clicking and dragging the subset to an icon on the document page.

In certain embodiments the analysis space is on the document page. In other embodiments the analysis space is on a separate page.

Some embodiments may further comprise the engine providing the associated context information in response to additional user input to the analysis space.

According to various embodiments the database comprises an in-memory database, and the engine comprises an in-memory database engine.

The following detailed description and accompanying drawings provide a better understanding of the nature and advantages of embodiments.

BRIEF DESCRIPTION OF THE DRAWINGS

FIGS. 2A-C are screen shots of an example of visualization of a data portion in a same page of an interface according to an embodiment.

FIGS. 3A-D are screen shots of an example of visualization of data portions on a separate page of an interface according to an embodiment.

FIG. 6 illustrates an example computer system.

DETAILED DESCRIPTION

Described herein are methods and apparatuses configured to provide visualization of data view portions for purposes of analysis and/or collaboration. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

As employed herein, the term "tuple" refers to an ordered set of at least two pieces of data stored in an underlying database. Thus, in certain embodiments a tuple may comprise a measure name (e.g., Gross Margin) together with a measure value (e.g., the $ amount of the Gross Margin). A tuple may comprise further information, for example an indication of a type of the data (e.g., Actual or Forecast). As discussed below, particular embodiments can automatically transform a snippet of table data into tuple(s) displayed in a chat room/collaboration system. A tuple may be displayed exclusively in the form of characters (e.g., text, numerals, symbols) in order to conserve available space.

Figure 1:
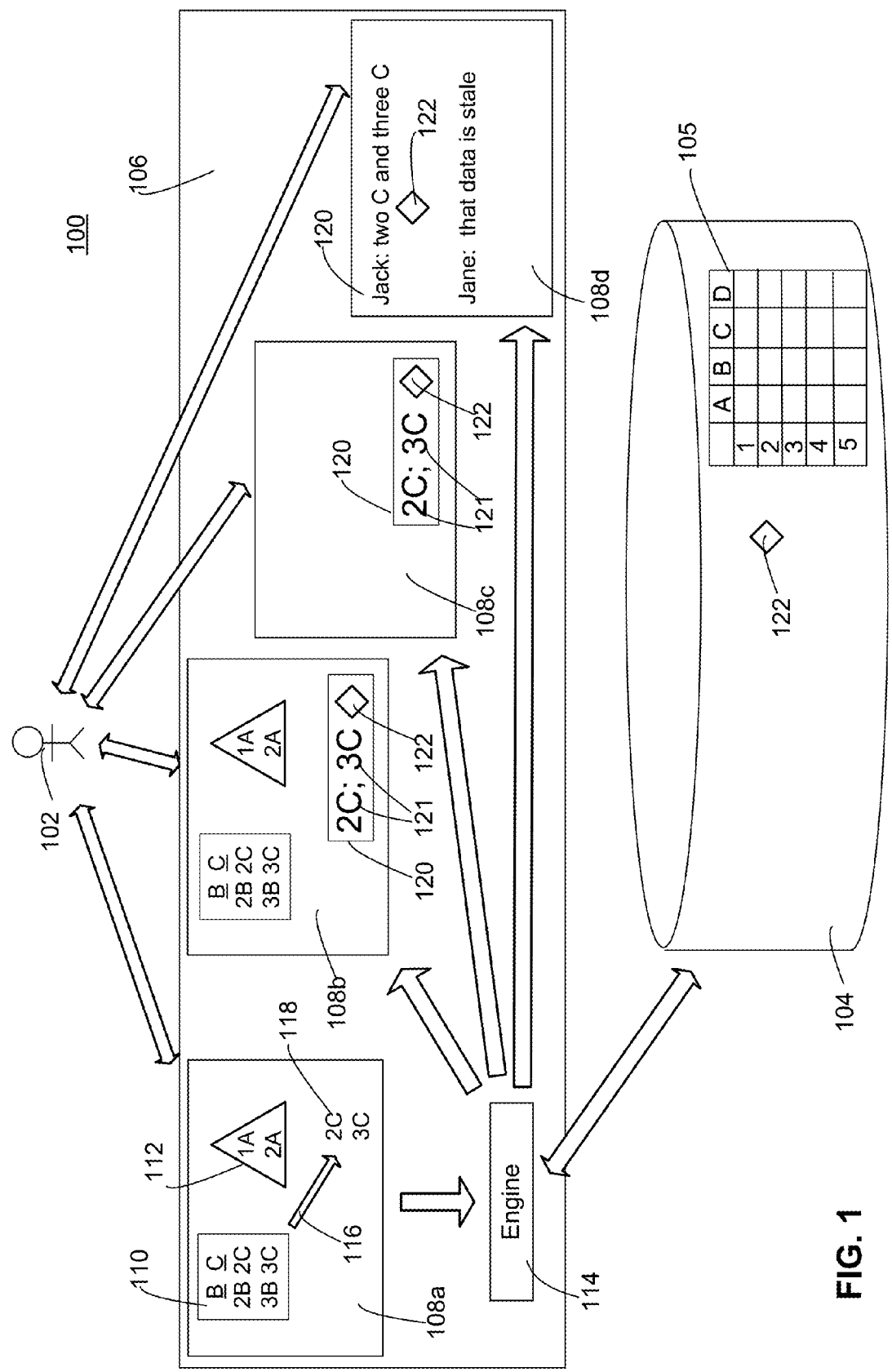
FIG. 1 shows a simplified block diagram of a system according to an embodiment.

FIG. 1 presents a simplified view of a system 100 according to an embodiment. In particular, a user 102 (e.g., Jack) is configured to access data stored in an underlying database 104, via an intervening application layer 106 including an interface screen 108a. The database data may be stored as a table 105 comprising rows and columns.

That interface screen includes a plurality of separate data views, e.g. table 110, and chart 112. These data views are assembled on the basis of database data responsive to queries that have been promulgated from the application layer to the underlying database.

FIG. 1 further shows the application layer as including an interface engine 114. As discussed in detail below, based upon a user input 116 to select a subset 118 of a data view, the interface performs a transformation operation and generates a copy 120 of a data view portion in an analysis space.

Here, the user input comprises clicking and dragging a data snippet comprising only fields 2C and 3C from the larger table 110 being displayed on the interface screen 108a. As a result of this input, a filtering operation is performed on the data view to produce the data view portion copy 120 including the tuple 121.

As shown in the interface screen 108b, that analysis space can occupy an unused area available on the original document page. Alternatively, as shown in the interface screen 108c, that analysis space can comprise an entirely separate page. Further alternatively, as shown in the interface screen 108d, the analysis space can comprise a collaboration space specifically designed to afford access by other users (e.g., Jane).

As further described in detail below, the data view portion resulting from the transformation that is copied to the analysis space, includes not only the data itself but also associated context information 122 that is stored in the underlying database. Examples of such associated context information can include but is not limited to:

metadata (e.g., measure name, dimension name);

database queries (e.g., previous or even updated via an icon);

formatting (e.g., text highlighting, color, font, font size, etc.).

This associated context information is retained with the copy of the relevant data portion. It can thus be accessed in the analysis space, for example by a further user input thereto (e.g., by clicking on the text or on an update icon, as discussed in the example later below). That associated context information may/may not be automatically presented in the analysis space, in order to simplify communication of relevant data (e.g., to focus reviewer attention upon key elements of copied data, rather than all possible available data).

In summary, embodiments allow a user to transform a desired portion of a data view (e.g., table or chart) and drag that portion to at least one of:

free space on the same page (e.g., a dedicated region);

a separate page allocated for this purpose;

inside a separate discussion/collaboration panel; or somewhere else, depending upon the exact mechanism.

When the transformed data portion is copied onto any additional location, the original context is also brought along. Examples of such original context can include but are not limited to the underlying query, the original formatting, and associated metadata.

The user can optionally change the formatting (color, text, size) of the copy of the data portion appearing in the new region. Such an adjustment in format may only affect the copy, and not the original source or other copies of the data.

While FIG. 1 shows the interface engine as being part of an application layer overlying a database layer, this is not required. As discussed further below, according to certain embodiments the interface engine may be implemented by a database engine, such as an in-memory database engine (e.g., the HANA in-memory database available from SAP SE of Walldorf, Germany).

Figure 1A:
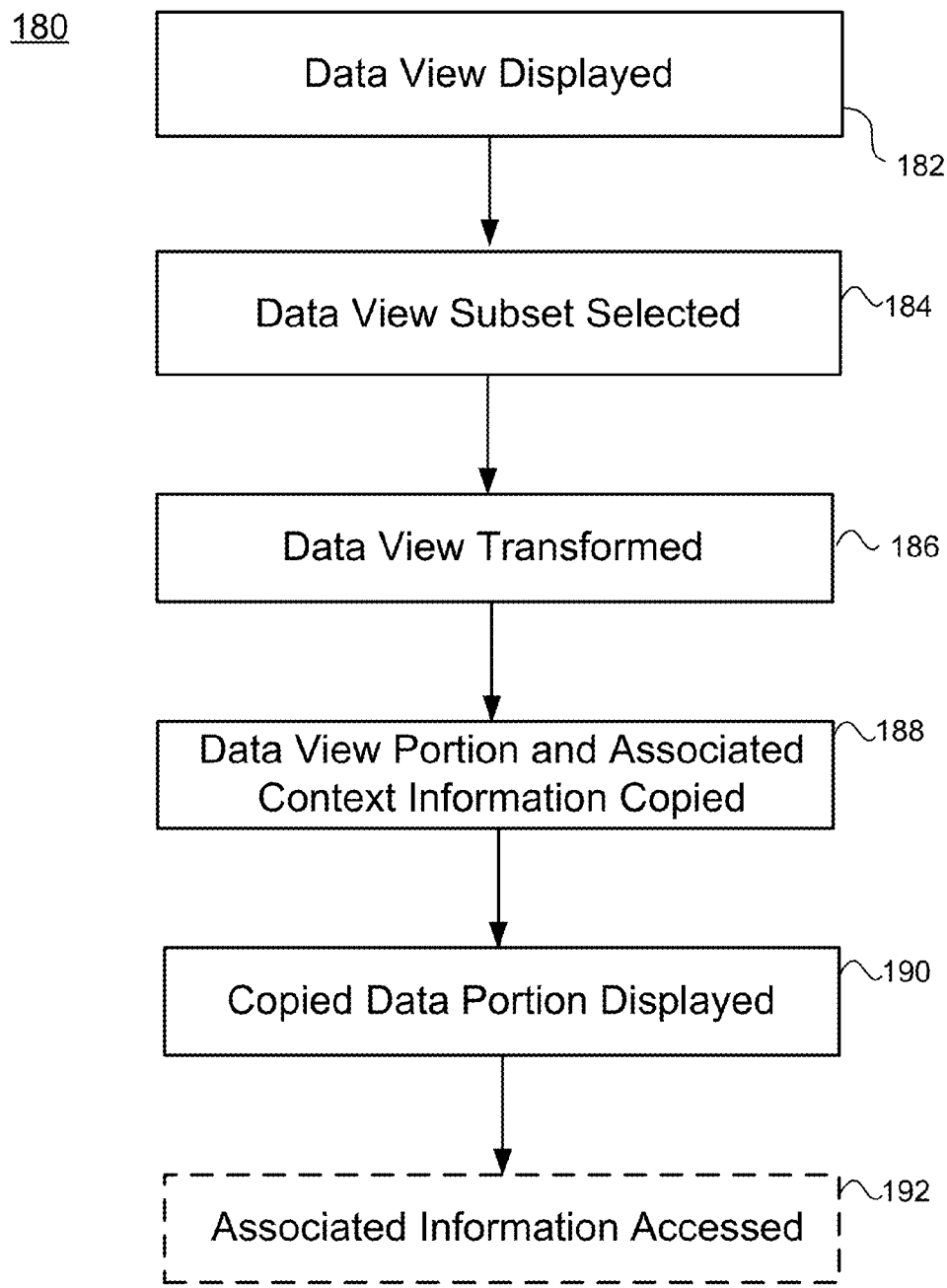
FIG. 1A shows a simplified flow diagram of a method according to an embodiment.

FIG. 1A is a simplified flow diagram showing a method 180 according to an embodiment. In a first step 182 a data view is displayed.

In a second step 184, a subset of the data view is selected by user input (e.g., clicking and dragging). In a third step 186, a filtering operation transforms the data view according to the user input.

In a fourth step 188, a portion of the data view resulting from the transformation, is copied. During this step, context information associated with the data view portion (e.g., the data query) is also copied. This allows the system to update the copied data view portion with current values.

In fifth step 190, the copied data portion is displayed in an analysis space. In an optional sixth step 192, associated context information is accessed via further user input to the analysis space.

EXAMPLES

Examples of a system providing an interface for transforming and visualizing data portions according to various embodiments, are now described in connection with FIGS. 2A-4C. These specific examples relate to financial data, such as profit and loss statements. However, embodiments are not limited to that particular application, and may be used to transform/copy any type of information for visualization or collaboration.

Figure 2A:
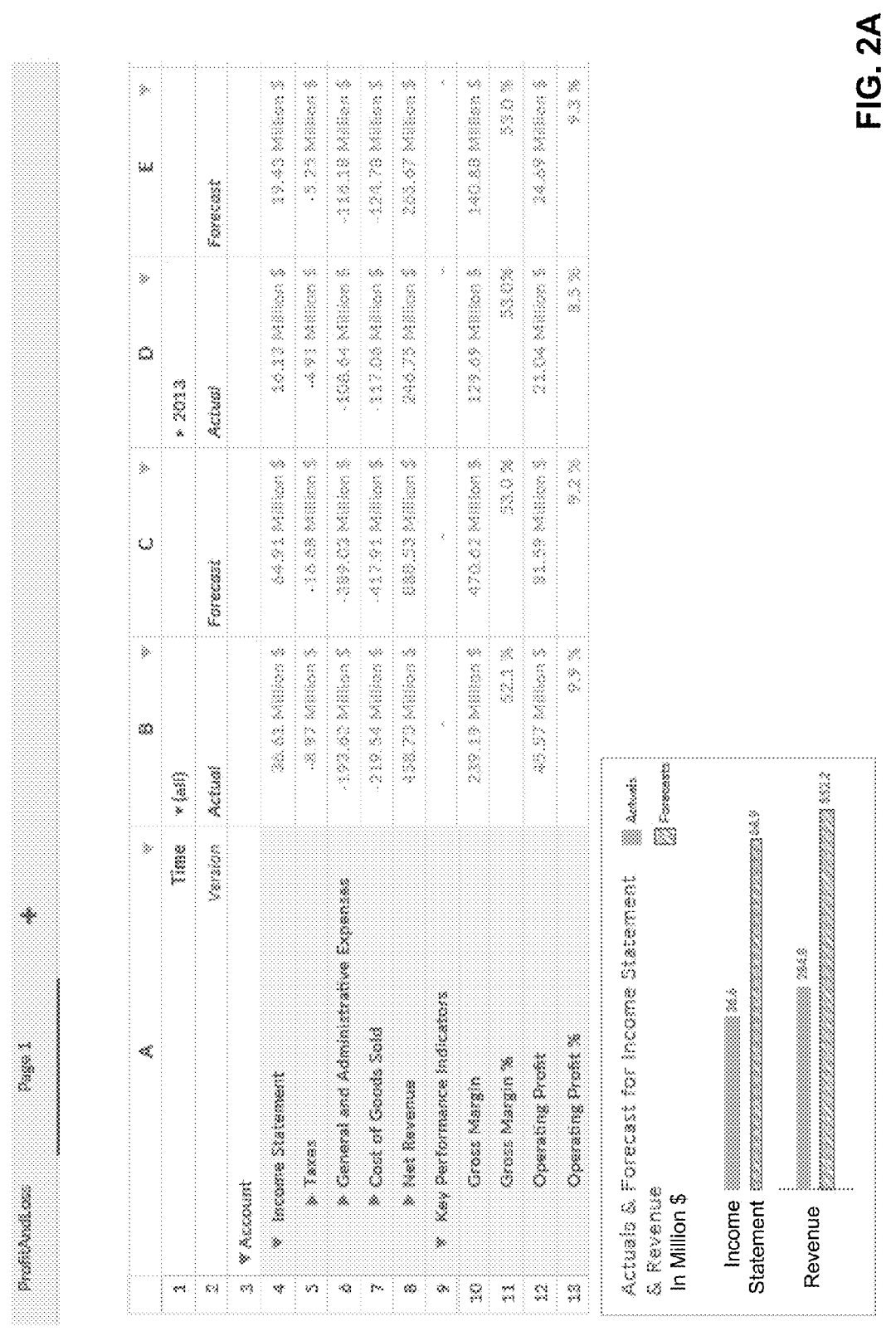
Figure 2B:
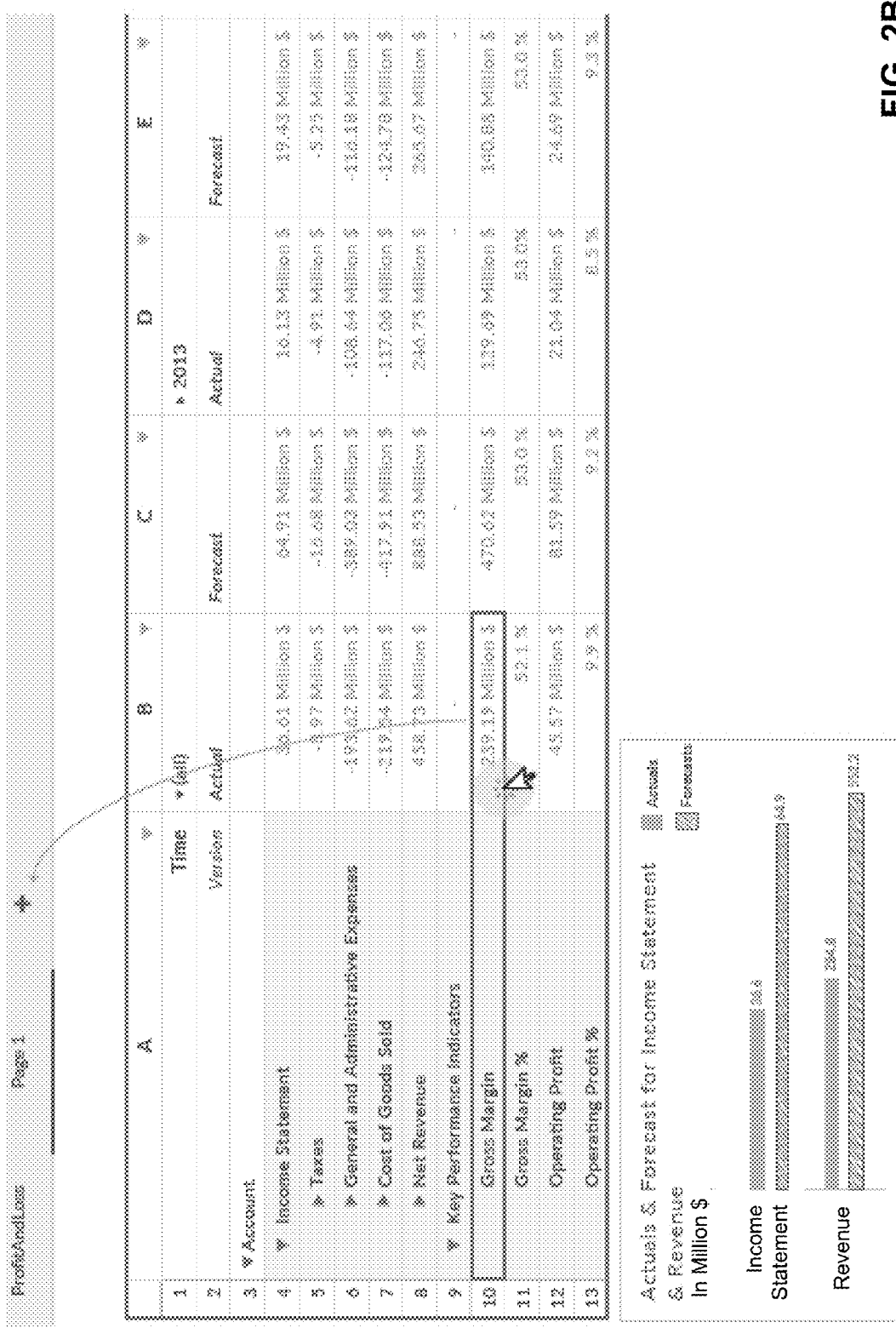
Figure 2C:
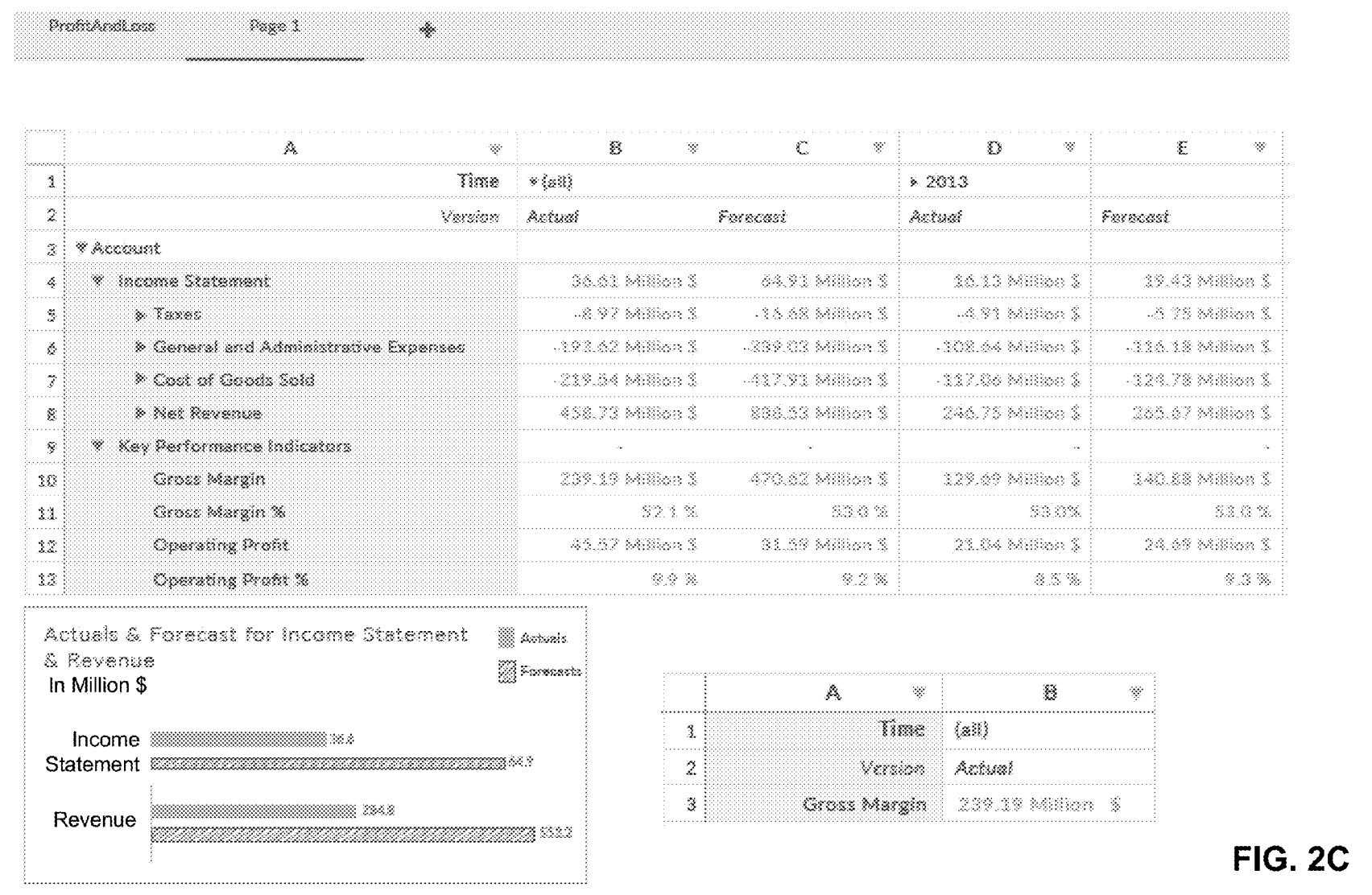

FIGS. 2A-C are screen shots of an example of visualization of a transformed data portion according to an embodiment in an analysis space located on a same document page. Here, FIG. 2A shows a document page including a data view in the form of a table including a measure name ("Gross Margin") and a corresponding measure value ($239.19 million).

FIG. 2B shows the user selecting the Gross Margin measure name and value as a relevant subset, and dragging that selection to an icon (+) on the document page. As a result of this user input, FIG. 2C shows performance of a filtering operation by the engine upon the data of the data view.

Based upon this input, the interface changes to display on the same document page, a portion of the data view. In particular, the data view portion comprises a tuple including the measure name (Gross Margin), the measure value ($239.19 million), as well as associated context information including a dimension (time) and a data type (Actual—i.e., rather than planned/forecast).

Figure 3A:
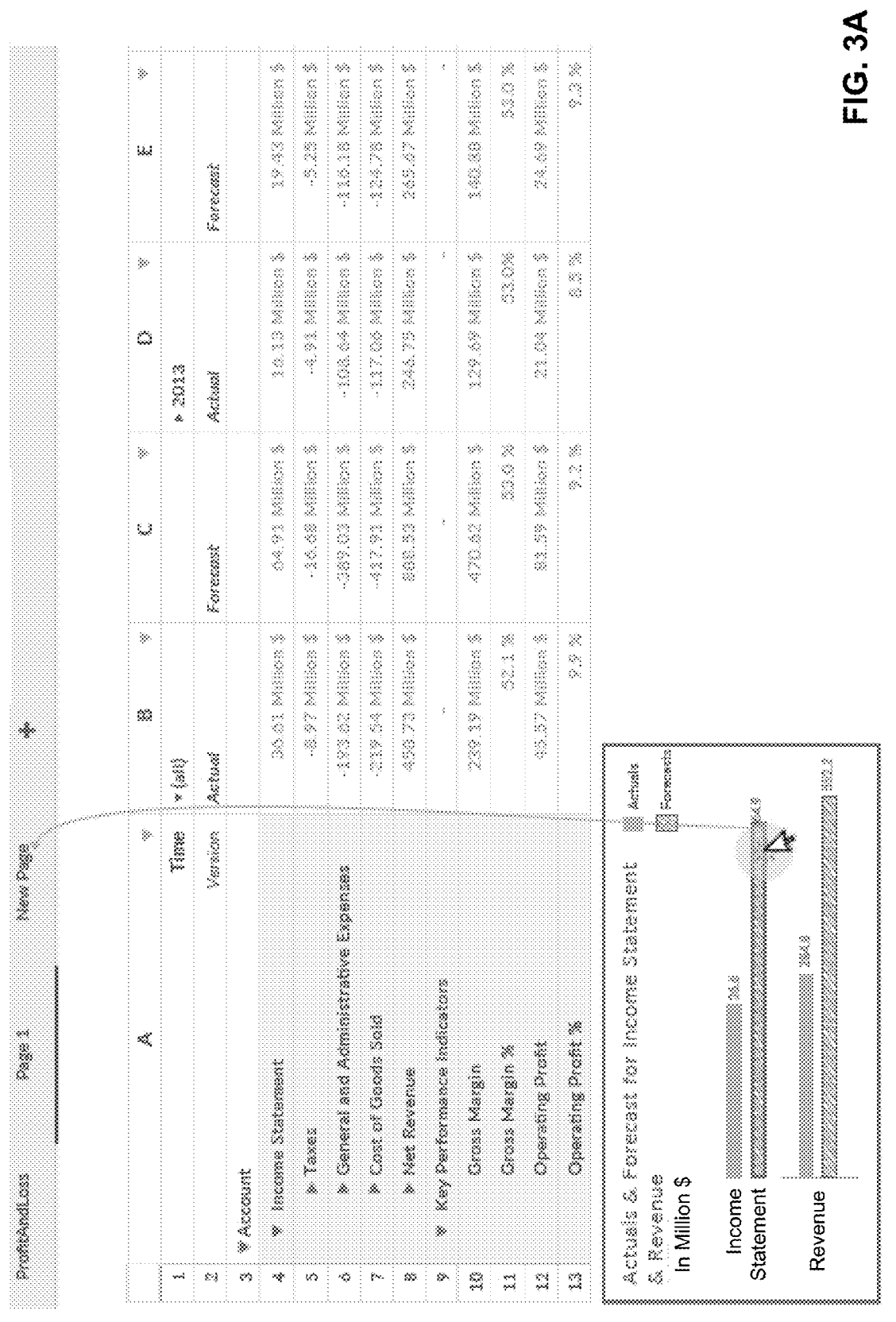
Figure 3B:
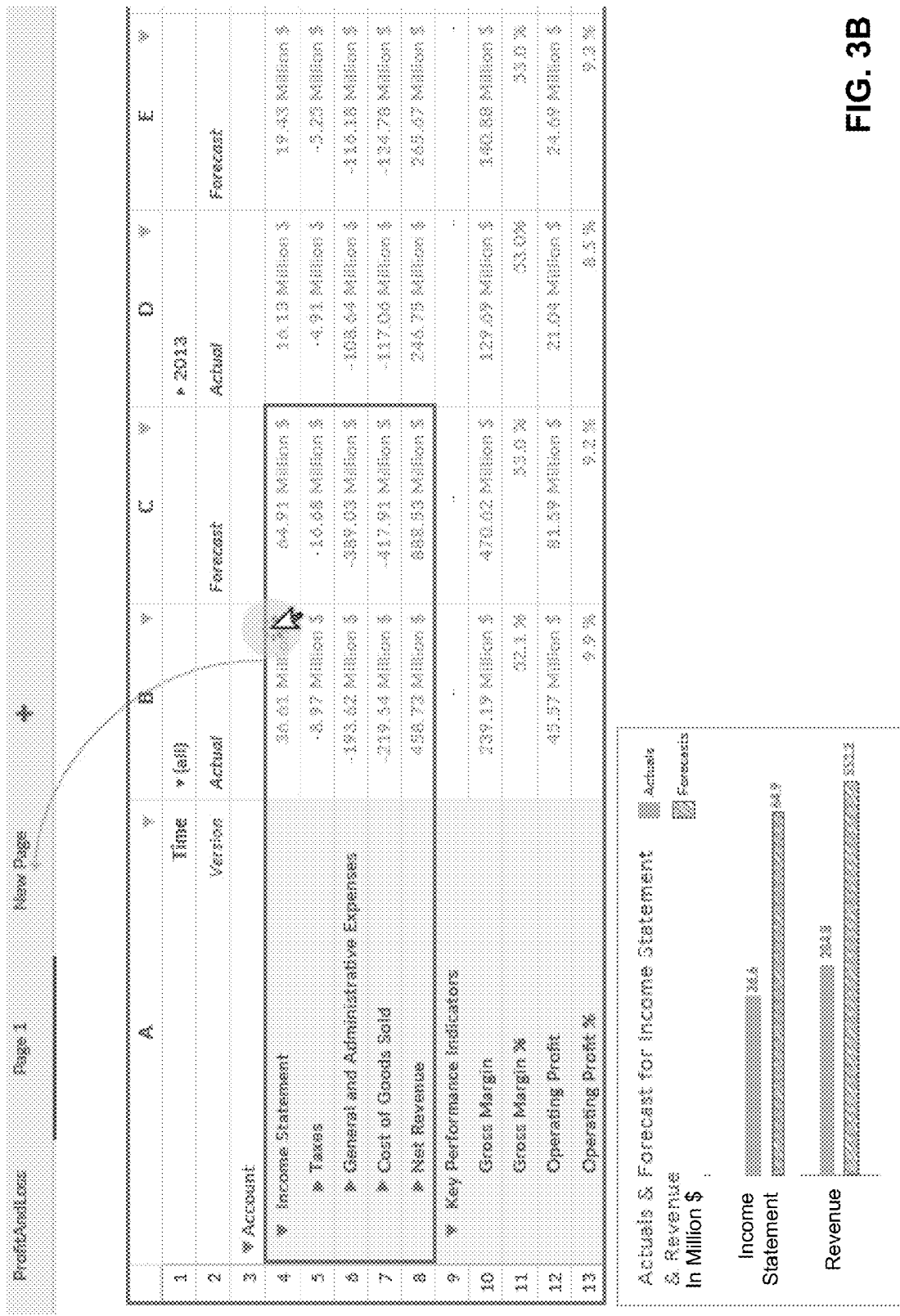

FIGS. 3A-D are screen shots of an example of visualization of data portions in an analysis space that is located on a separate page. In particular, FIG. 3A shows the user selecting the "Forecast Income" measure name as a relevant subset from a data view comprising a bar chart, and dragging that selection to a "New Page" button icon.

Figure 3C:
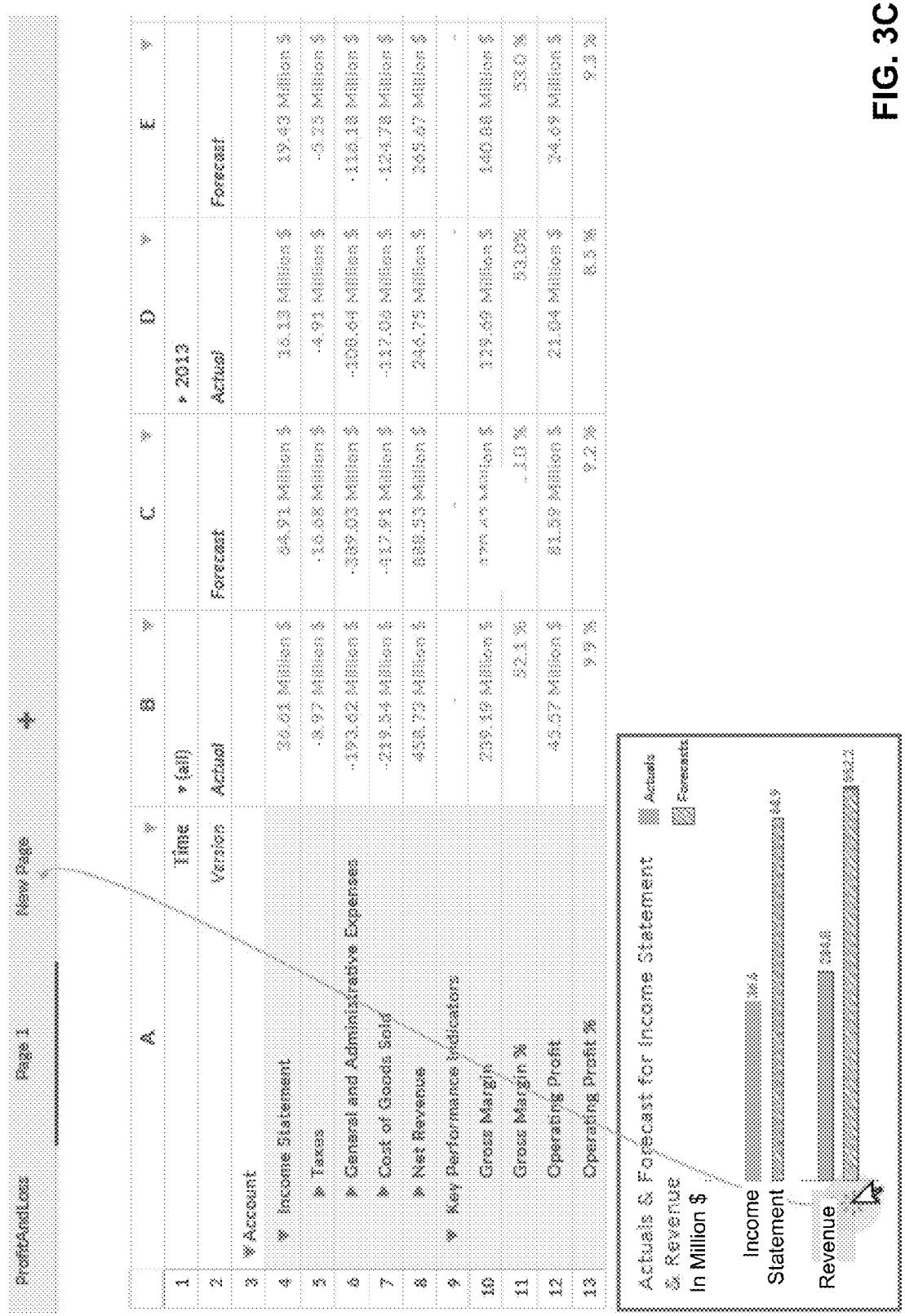

FIG. 3B shows the user also selecting the "Income Statement" measure name and values as a relevant subset from a table data view. FIG. 3C further shows the user selecting both the actual and forecast revenue as a relevant subset from a second bar chart data view.

Figure 3D:
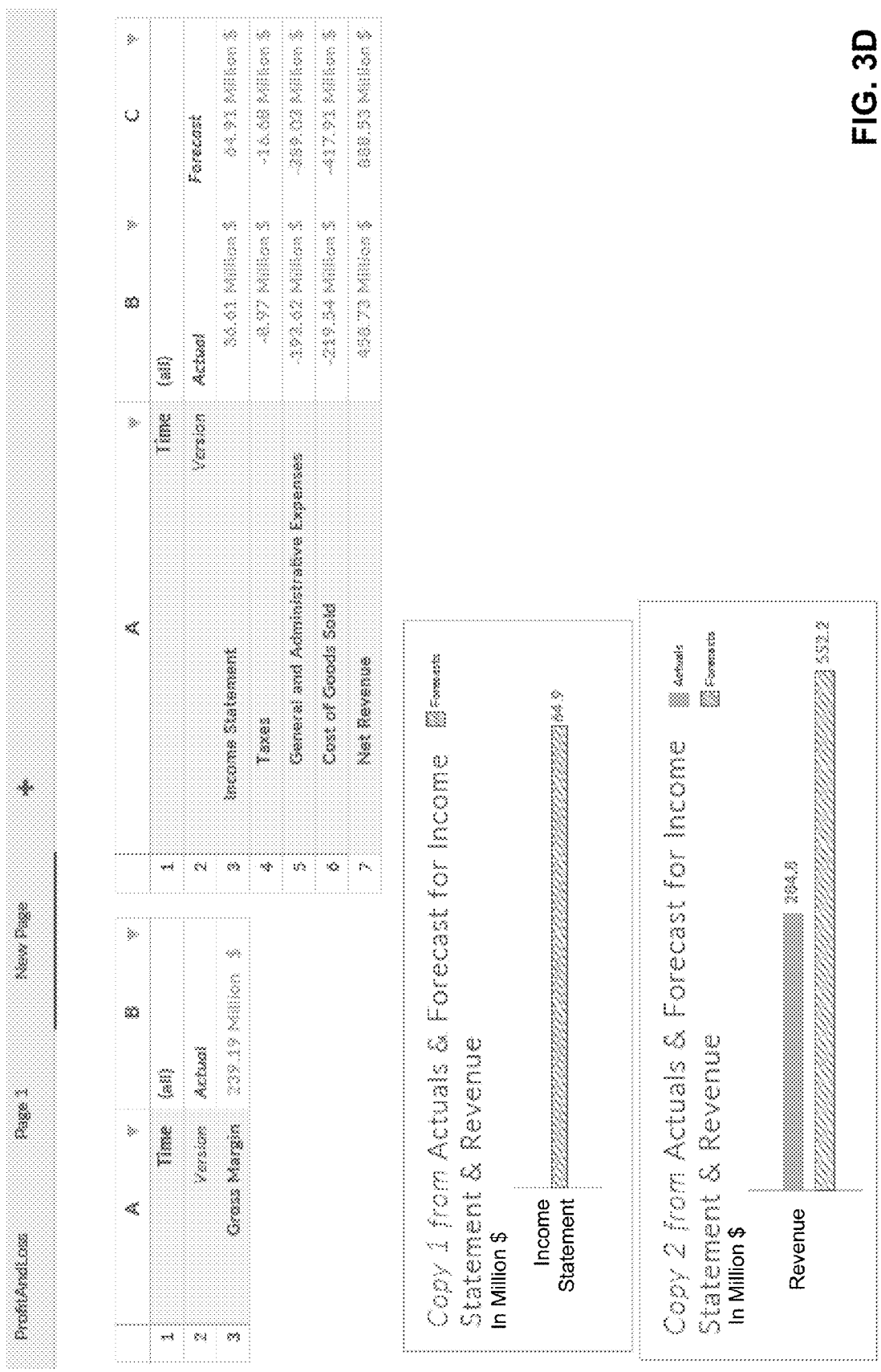

As a result of this user input, FIG. 3D shows the interface changing to display a new page including copies of relevant transformed data view portions (tuples) that were selected in FIGS. 3A-C. Also displayed in the screenshot of FIG. 3D, is the tuple representing the portion of the table data view selected in FIG. 2B (as if it had been dragged to a New Page button icon).

Display of the selected relevant data view portions on the separate screen of FIG. 3D, allows the user (and others having access) to focus particular upon the specific data presented there, in order to recognize/appreciate important relationships. While this data is offered as part of the original document page of FIG. 2A, it significance (including key relationships between certain measures and/or dimensions) may be obscured by the sheer volume/variety of other data also forming a part of that interface screen.

Figure 4A:
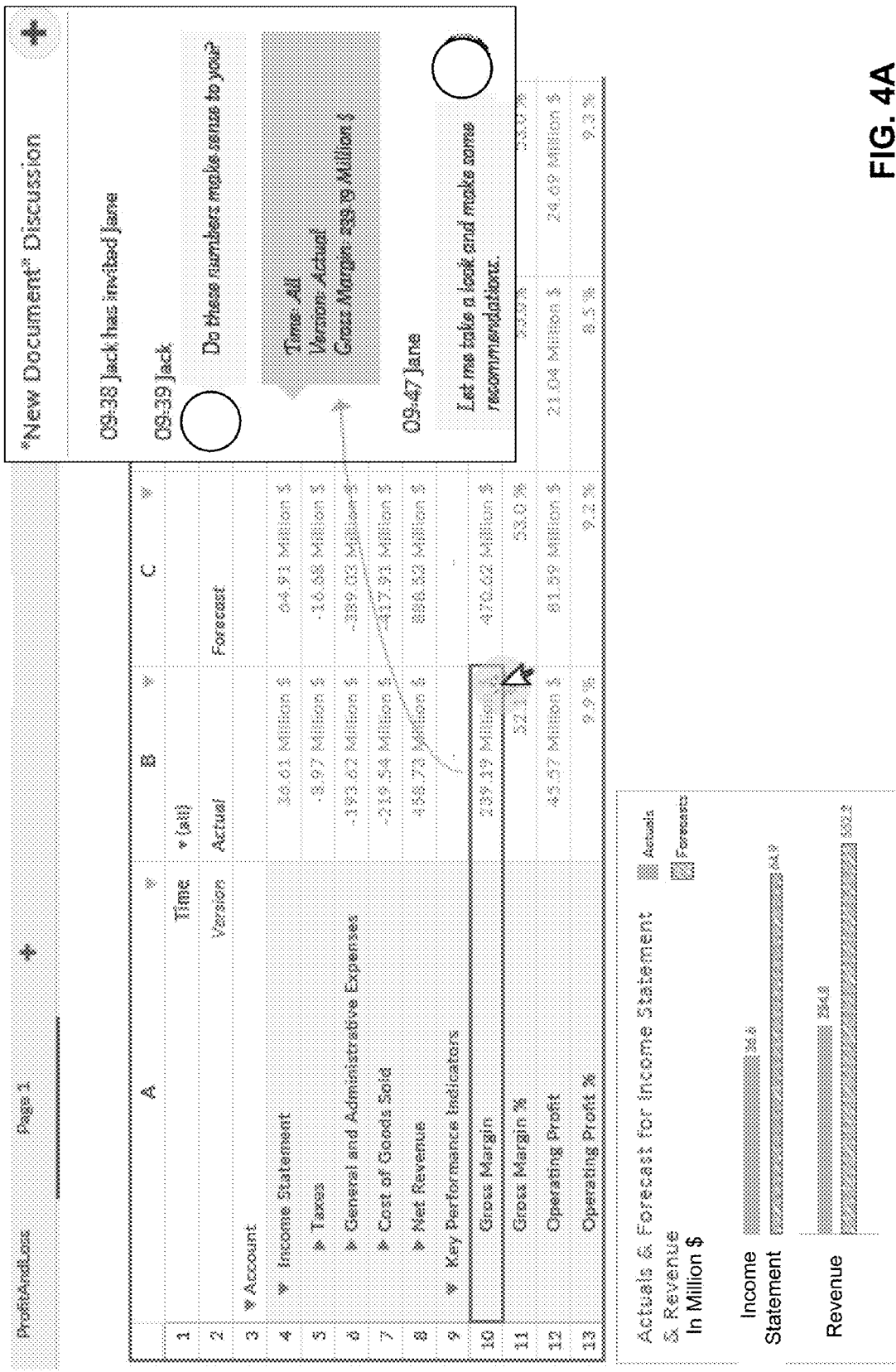
FIGS. 4A-C are screen shots of an example of visualization of data portions in a chat window of an interface according to an embodiment.
Figure 4B:
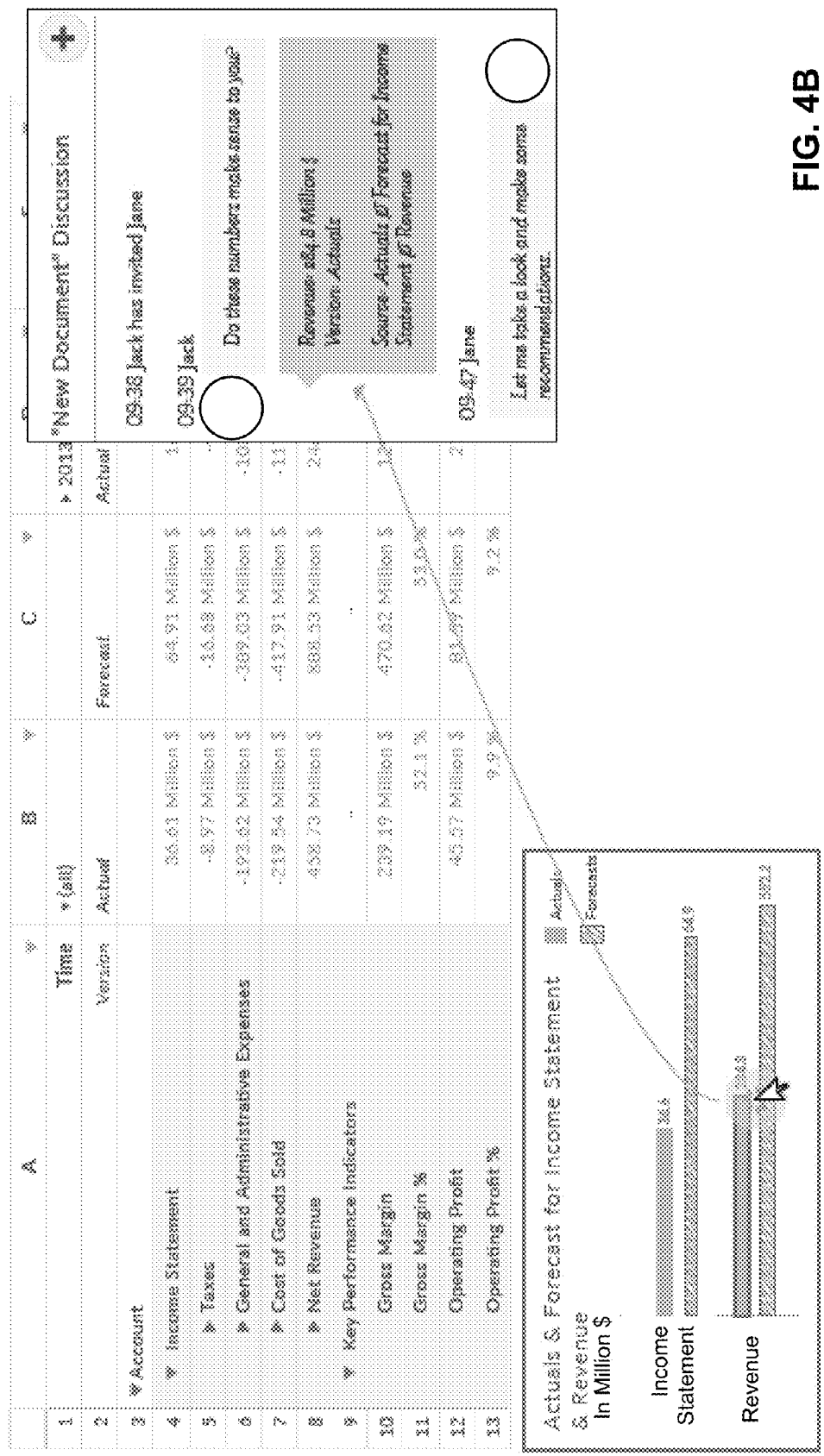
Figure 4C:
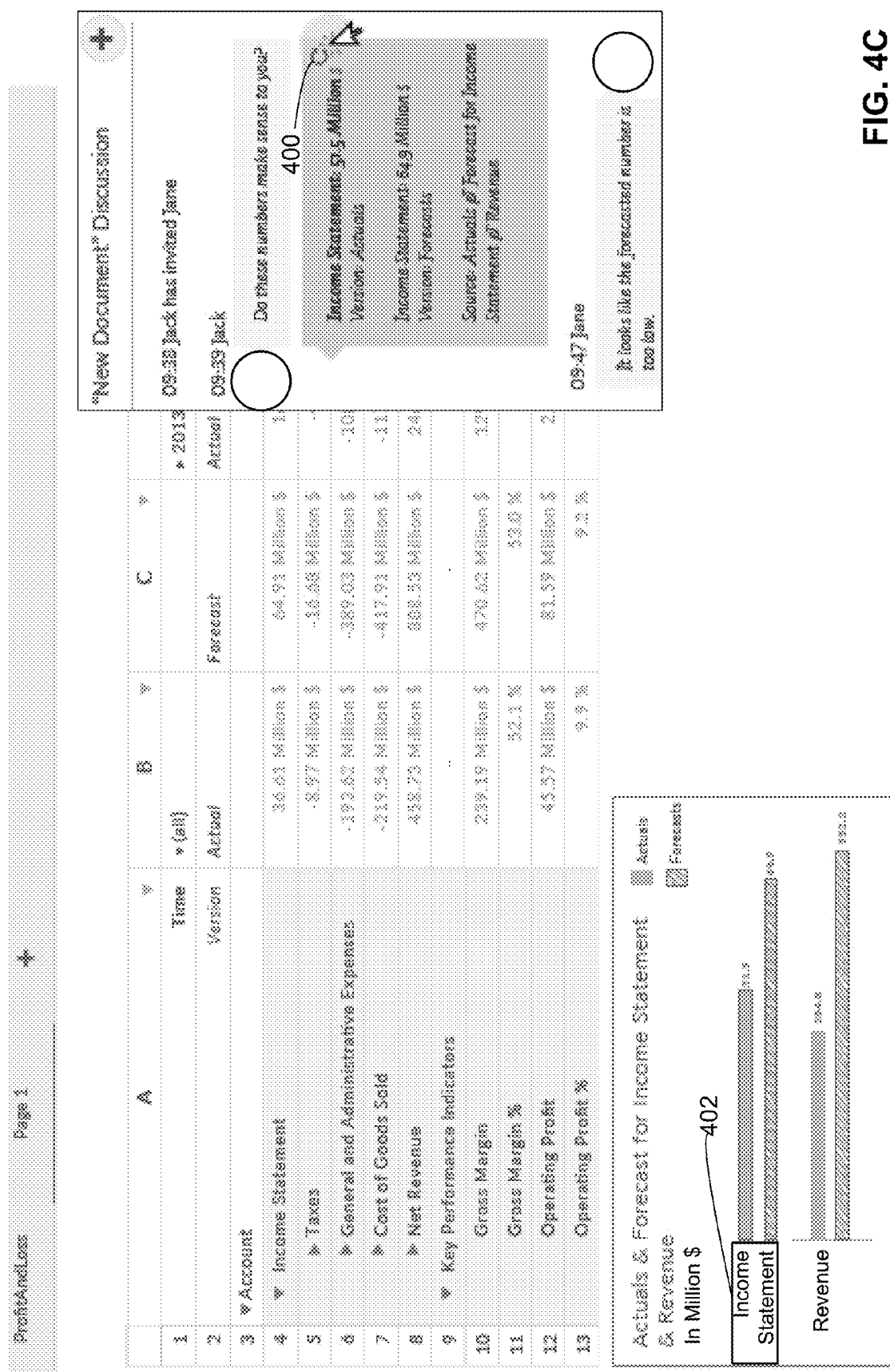

FIGS. 4A-C are screen shots of an example of visualization of data portions in a collaboration space of an interface according to an embodiment. Here, the collaboration space comprises a chat window accessible to other parties for comment.

In this example, once the copy of the relevant portion of the data view has been selected and placed into the collaboration space (FIG. 4A), the item is converted into a chat bubble showing only characters of the copied portion. Here, this text comprises a tuple including a measure name (Gross Margin), a dimension name (Time), and a value of the measure ($239.19 million).

In this manner the limited space available in the chat bubble is not consumed by non-textual information (e.g., graphs/tables whose shrunken labels would be difficult to read). This renders the relevant portions of the data view selected by the user (Jack) readily accessible to the collaborator (Jane), facilitating her involvement/contribution.

FIG. 4B shows another example of the selection of a relevant data view portion to a collaboration space. Again the tuple of the data view portion is converted to characters (only), in order to facilitate consumption in the limited area available to the chat bubble. Thus, unlike the particular example of FIG. 3D, the hatched bar shape present within the original data view is not reproduced within the analysis space (collaboration panel).

As emphasized above, the data copy within the collaboration space retains the original context information, e.g., the underlying query. If the underlying data view portion (tuple) displayed in the chat bubble has received an update (e.g., by the engine re-running the query), a refresh icon may appear for user selection.

Such a user interaction to update the data view portion of FIG. 4B, is shown in FIG. 4C. In particular, the user can click on that 'refresh' icon 400 and see the updated value. That updated value may appear both in the copied data view portion within the collaboration space, and also in its original location in the document page.

Values having relevant updates may be displayed in a particular format in order to indicate their status. Examples of formatting which may be changed/controlled, can include but are not limited to text bolding, highlighting, italicizing, coloration, sizing, font, etc.

Various other formatting aspects may be employed to further focus a reviewer upon key relevant portions of data from a data view. For example, in the collaboration space the copied data portion may increase in size/contrast to indicate significance of the data item (e.g., the transformed bar chart portions copied for display in FIG. 3D).

Once the copied data portion is present within the collaboration space, the user can click on that data portion in order to highlight the specific area in the original document where the data item was copied from. As shown in FIG. 4C, clicking on the chat bubble can highlight 402 the relevant chart or table on the original document page.

As mentioned previously, certain embodiments of the interface engine may be implemented in whole or in part by a database engine, such as an in-memory database engine. Thus data view portions that are copied according to embodiments may be configured to reference data stored in an underlying database (e.g., a relational-type database).

The database can be an in-memory type database, for example the HANA in-memory database available from SAP SE of Walldorf, Germany. Apart from the HANA database just mentioned, other in-memory databases can include the SYBASE IQ database also available from SAP SE; the Microsoft Embedded SQL for C (ESQL/C) database available from Microsoft Corp. of Redmond, Wash.; and the Exalytics In-Memory database available from Oracle Corp. of Redwood Shores, Calif.

Figure 5:
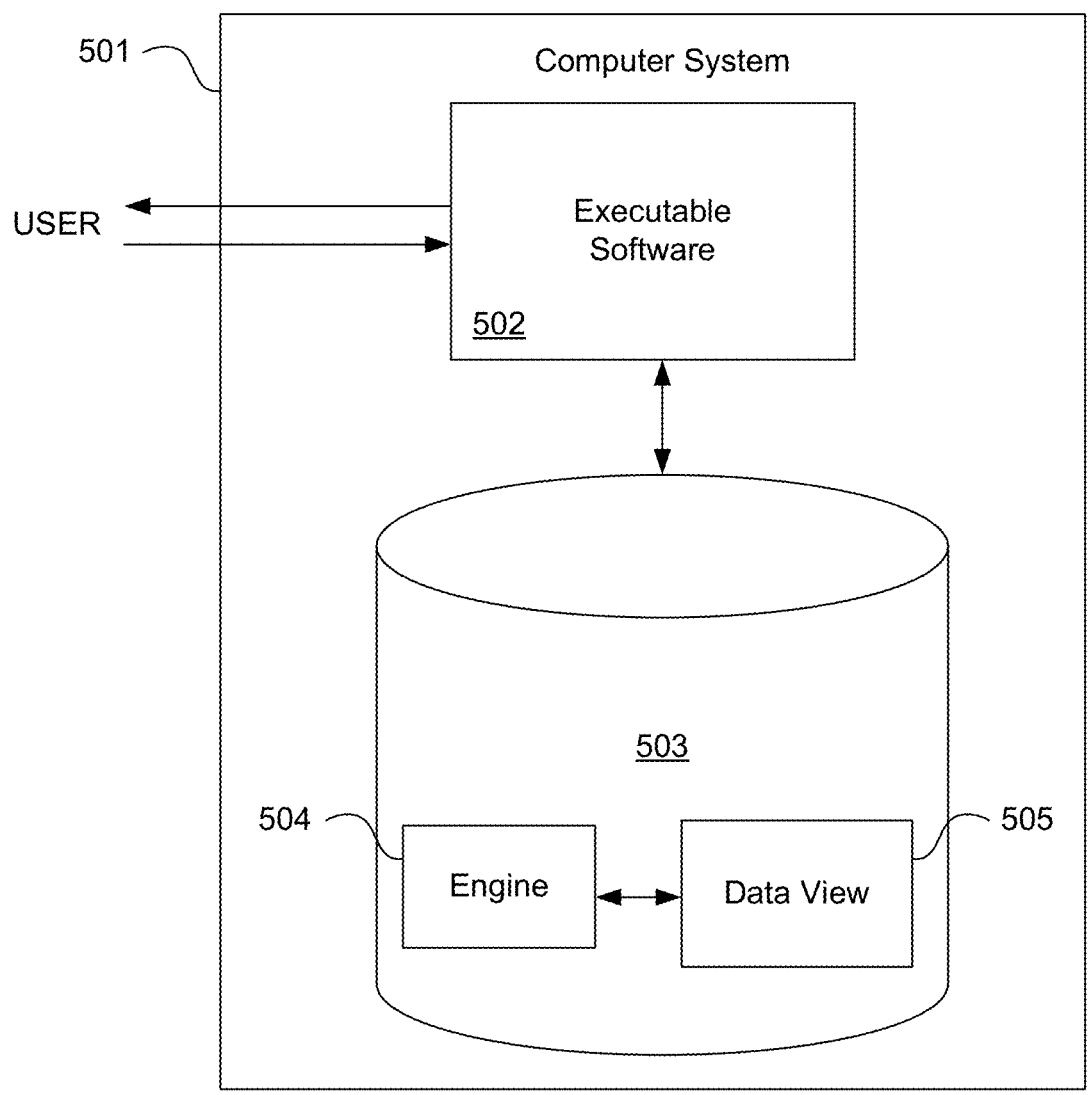
FIG. 5 illustrates hardware of a special purpose computing machine configured to provide visualization of data portions according to an embodiment.

For example, FIG. 5 illustrates hardware of a special purpose computing machine configured to provide data portion copying for analysis and/or collaboration according to an embodiment. In particular, computer system 501 comprises a processor 502 that is in electronic communication with a non-transitory computer-readable storage medium 503. This computer-readable storage medium has stored thereon code 505 corresponding to a data view. Code 504 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the engine is shown as being part of a database. Such an embodiment can correspond to applications performing processing by a powerful engine available as part of an in-memory database (e.g., the HANA in-memory database available from SAP SE of Walldorf, Germany). However, this not required and in certain embodiments (e.g., that shown in FIG. 1) the engine may be implemented in other ways, for example as part of an overlying application layer.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
an in-memory database engine receiving a data view in response to a query to an in-memory database;
the in-memory database engine displaying the data view in a document page;
the in-memory database engine receiving a first user input selecting a subset of the data view;
in response to the first user input, the in-memory database engine,
transforming the data view to create a data view portion including a tuple and associated context information comprising the query, and
displaying a copy of the tuple in an analysis space in a collaboration panel, the analysis space comprising an icon; and
in response to a second user input to the icon, the in-memory database engine,
transforming the data view portion including an updated tuple and associated context information comprising an updated query producing the updated tuple, and
displaying a copy of the updated tuple in the analysis space.

2. A method as in claim 1 wherein:
the data view comprises a table;
the subset comprises cells of the table; and
the copy of the tuple comprises a measure value.

3. A method as in claim 1 wherein the copy of the tuple includes characters only.

4. A method as in claim 3 wherein the copy of the tuple comprises a measure name and the measure value.

5. A method as in claim 1 wherein the user input comprises clicking and dragging the subset to a second icon on the document page.

6. A method as in claim 1 wherein the analysis space is on the document page.

7. A method as in claim 1 wherein the analysis space is on a separate page.

8. A method as in claim 1 further comprising the engine providing the associated context information in response to additional user input to the analysis space.

9. A non-transitory computer readable storage medium embodying a computer program for performing a method, said method comprising:
an in-memory database engine receiving a data view in response to a query to an in-memory database;

the in-memory database engine displaying the data view in a document page;

the in-memory database engine receiving a first user input selecting a subset of the data view;

in response to the first user input, the in-memory database engine, transforming the data view to create a data view portion including a tuple and associated context information comprising the query, displaying a copy of the tuple in an analysis space in a collaboration panel, the analysis space comprising an icon;

in response to a second user input to the icon, the in-memory database engine, transforming the data view portion including an updated tuple and associated context information comprising an updated query producing the updated tuple, and displaying a copy of the updated tuple in the analysis space; and the in-memory database engine providing the associated context information in response to additional user input to the analysis space.

10. A non-transitory computer readable storage medium as in claim 9 wherein the copy of the tuple includes characters only.

11. A non-transitory computer readable storage medium as in claim 10 wherein the copy of the tuple comprises a measure name and a measure value.

12. A computer system comprising:
one or more processors;
a software program, executable on said computer system, the software program configured to cause an in-memory database engine to:
provide a data view on a document page in response to a query to an in-memory database;
receive a first user input selecting a subset of the data view; and
in response to the first user input,
    transform the data view to create a data view portion including a tuple and associated context information comprising the query, and
    display a copy of the tuple in an analysis space in a collaboration panel, the analysis space comprising an icon;
in response to a second user input to the icon,
    transform the data view portion including an updated tuple and associated context information comprising an updated query producing the updated tuple, and
    display a copy of the updated tuple in the analysis space.

13. A computer system as in claim 12 wherein the copy of the tuple includes characters only.

14. A computer system as in claim 12 wherein the analysis space is on the document page, or is on a different interface screen.

15. A computer system as in claim 12 wherein the software program is further configured to cause the in-memory database engine to access the associated context information based upon additional user input to the analysis space.

* * * * *